July 16, 1929.    M. DOERR    1,720,946
GAME DEVICE
Filed June 27, 1928    2 Sheets-Sheet 1
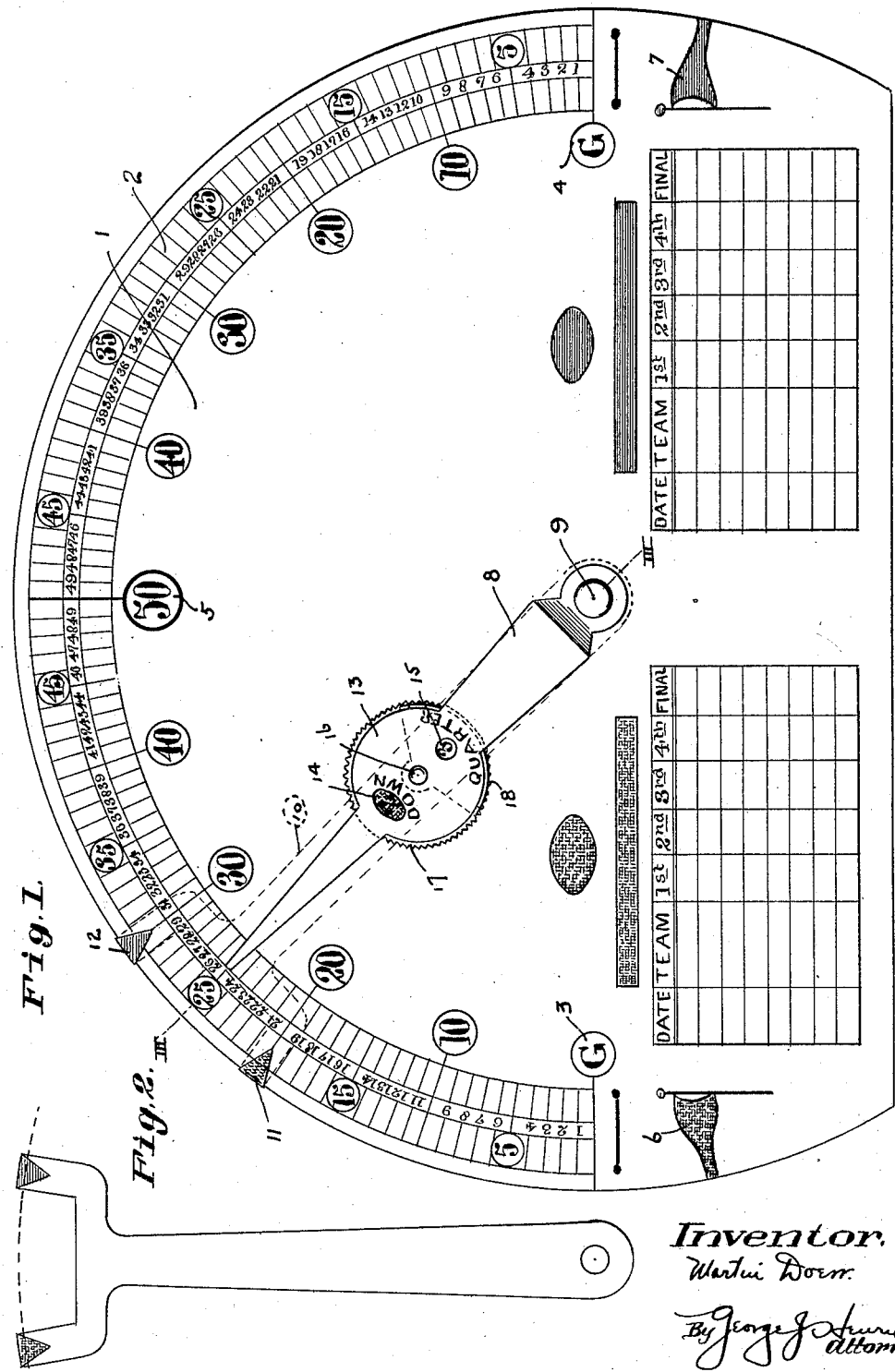

July 16, 1929. M. DOERR 1,720,946
GAME DEVICE
Filed June 27, 1928 2 Sheets-Sheet 2
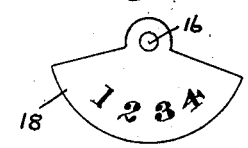
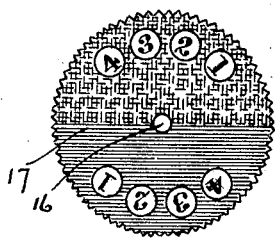
Inventor.
Martin Doerr
By George J. Henry
Attorney.

Patented July 16, 1929.

1,720,946

UNITED STATES PATENT OFFICE.

MARTIN DOERR, OF SAN FRANCISCO, CALIFORNIA.

GAME DEVICE.

Application filed June 27, 1928. Serial No. 288,626.

My invention has for its object a chart or base graduated or laid off to represent a field on which a game is being played and provided with movable means to indicate the progress of the play and is adapted to indicate the progress of a game especially as the latter is reported over the telephone, telegraph or radio.

It may with advantage be used in large sizes as for window display or in front of newspaper offices or in the smaller sizes suited for individual desk or table use.

While my invention is particularly adapted to indicate the progress of a football game, it may also be adapted to use with other games as baseball, cricket, and the like.

By its use one may more correctly visualize and maintain before him the progressive moves in a game as reports thereon are received.

By referring to the accompanying drawing my invention will be made clear.

Fig. 1 is a front view of my invention as employed for indicating the progress of a football game.

Fig. 2 is a detail of the flag marker movable thereon.

Fig. 3 is a cross section of Fig. 1 on the line III—III thereof.

Fig. 4 is a detail of the indicator for the game quarters.

Fig. 5 is a detailed front view of the disc indicating the downs.

Fig. 6 is a showing partly in cross section similar to Fig. 3 of a modified form thereof.

Fig. 7 is a front view of Fig. 6.

Fig. 8 is a fragmentary front view of the football-down indicator 26, of Fig. 7.

Fig. 9 is a cross section on the line IX—IX of Fig. 8.

Throughout the figures similar numerals refer to identical parts.

A base member is indicated by the numeral 1 on which is laid off the scale of yards 2, from the respective goals 3, 4 in each direction towards the 50 yard line 5, at the center. The goal 3 is in the possession of the team whose color is indicated by the flag at 6 and the goal 4 is in the possession of the team whose color is indicated by the flag at 7.

A pointer or indicator arm at 8 pivoted at 9 adapted to move over the yard scale between the goals 3 and 4 and indicate on the yard scale the position of the ball after any reported play. Pivoted also about the center 9 is the flag indicator 10 which in the example here chosen for illustrating my invention is pivoted on the back of the base 1 and has terminal flag pointers 11, 12 respectively, spaced 10 yards apart and bent over to indicate as shown on the yard scale on the front of the base 1.

On the pointer 8 is the double indicating face 13 having a perforation at 14 through which the downs are indicated with the printed word "Down" thereunder, and another perforation at 15 through which the quarters being played are indicated and having the word "Quarter" printed thereunder.

Pivoted at 16 and to the rear of the face plate 13 is the circular disc 17 and between 17 and 13 is also pivoted at 16 the segmental disc 18.

On the disc 17 are two sets of graduations running from 1 to 4 indicating the downs by each of the teams, one of these sets of graduations being in the color of the team 6 shown uppermost in Fig. 5 and the other the color of the team 7 shown in the lower portion of Fig. 5, so that by rotating the circular disc 17 under the perforation 14 downs 1, 2, 3, 4, may be respectively shown in the color of either team according to which team has accomplished the play.

The segmental disc 18 indicates the quarters.

The members 17 and 18 are independently movable on the pivot 16 and the members 21 and 26 are independently movable in the alternate form shown in Figs. 6 to 9.

The alternate form of pointer or arm 20 is provided with a slide 21 having the finger member 22 to facilitate its sliding on the arm 20 and also to move the arm 20 about the pivot 9.

The word "Quarter" is preferably imprinted on this slide 21 and it is moved up or down over the desired numeral to indicate the period or quarter of the play, and which is visible through the perforation 23.

The forward end of the pointer 20 is bent around to form a circular arc as best shown in cross section in Fig. 9 and thus forming a longitudinal opening 24, and slipped within the tubular portion of the pointer is the strip 25 having printed thereon the word "Down" and the numerals 1, 2, 3, 4.

The football indicator colored on one side to correspond with the team color 6, and on the other side to correspond with the team color 7, is provided with a hole 28 through which the numerals on the strip 25 are observable.

The pointer is preferably made of spring material and the football indicator 26 is drilled to frictionally engage with the circular portion thereof and is slidable over the numerals 1, 2, 3, 4, and may be rotated so that either side 26 or 27 is uppermost.

In order to rotate the ball the pointer 20 is sprung upward so that the ball is rotated through the dotted position 30 to expose either the side 26 or 27 depending upon which team has the ball.

The operation is as follows:

With the device before one and as reports of the game progress are received, the pointer is moved to indicate the position of the ball on the yardage lines by moving the pointer over the graduations on the scale 2.

Whenever the advance of the ball requires the pointer 8 to be moved ten yards or more the flag arm 10 may be independently moved to set the flags to the new play position required by the progress of the game.

The downs are indicated by rotating the circular disc 17 under the perforation 14, and the quarters by rotating the segmental disc 18 under the perforation 15 as the game progresses.

In the position of the parts as indicated in Fig. 1, the game is in the third quarter, there have been two downs played by the team whose color is 6. The ball has been advanced during the two downs 5 yards from its former position at 20 to its present position at 25 toward goal 4. If the team whose color is 6 is then successful during either of downs 3 or 4 in advancing the ball ten yards or more from its original position at 20, the flag pointer 10 is moved so that flag 11 is at the new play position of the ball, disc 17 is rotated to expose Down 1 and further indication of the progress of the game is resumed. In case, however, the team whose color is 6 is not successful in advancing the ball as above stated the ball goes into possession of the team whose color is 7, the flag pointer is moved so that flag 12 is at the position of the ball, disc 17 is moved to expose Down 1 with the color of team 7, and further indication of the progress of the game is resumed in the direction of goal 3.

In the alternate form of pointer device the quarters are indicated by the slide 21 and the downs by moving the football indicator 26 along the tubular portion of the pointer 20 to indicate the downs through the hole 28 which show through from the strip 25 and the football indicator is rotated through the dotted postion 30 by springing upward the pointer 20 to show the appropriate color as indicated on side 26 or 27 to correspond with the team that has possession of the ball.

I claim:

1. In a game device, a base graduated to indicate the progress of a game being played, an arm having a single pointer, said arm frictionally engaged with said base and said pointer movable over said graduations, a second arm frictionally engaged with said base and having two pointers circumferentially spaced apart a predetermined distance and movable over said graduations independent of said first named arm, and a plurality of movable means on one of said arms each indicating any of a number of game plays.

2. In a game device, a base graduated to indicate the progress of a game being played, an arm having a single pointer, said arm frictionally engaged with said base and said pointer movable over said graduations, a second arm frictionally engaged with said base and having two pointers spaced apart movable over said graduations independent of said first named arm, and a plurality of movable means on one of said arms each indicating any of a number of game plays, said base of segmental form and said arms positioned on the opposite sides of said base and holding means frictionally engaging said arms at a common center of movement and wherein the two pointers of the said second arm are bent to travel over said graduations.

3. In a game device as set forth in claim 1 wherein said first named arm is of relatively flat spring material with a circular central portion having a circular disc and a segmental disc pivoted centrally with said circular central portion said discs capable of independent operation and having game indications printed thereon, and said circular central portion having a plurality of openings through which said game indications on said discs are made observable.

4. In a game device as set forth in claim 2 wherein said first named arm is of relatively flat spring material with a circular central portion having a circular disc and a segmental disc pivoted centrally with said circular central portion said discs capable of independent operation and having game indications printed thereon, and said circular central portion having a plurality of openings through which said game indications on said discs are made observable.

5. In a game device as set forth in claim 1 wherein said first named arm is of relatively flat spring material having a forward portion bent in circular form with a longitudinal slot, a removable member having game indications imprinted thereon and insertable in said slot and one of said means is the simulation of a football frictionally engaged to slide and also to rotate over said portion and having an opening on each side through which said indications are observable.

6. In a game device as set forth in claim 1 wherein said first named arm is of relatively flat spring material having a forward portion bent in circular form with a longitudinal slot, game indications imprinted thereon and insertable in said slot and one of said means is the simulation of a football frictionally engaged to slide and to rotate over said portion and having an opening on each side through which said indications are observable, and the other of said means comprises a slide having a finger member and a perforation and frictionally slidable on the flat portion of said first named arm and other game indications on said flat portion observable through said slide perforation.

7. In a game device as set forth in claim 2 wherein said first named arm is of relatively flat spring material having a forward portion bent in circular form with a longitudinal slot, game indications imprinted thereon and insertable in said slot and one of said means is the simulation of a football frictionally engaged to slide and to rotate over said portion and having an opening on each side through which said indications are observable.

8. In a game device as set forth in claim 2 wherein said first named arm is of relatively flat spring material having a forward portion bent in circular form with a longitudinal slot, game indications imprinted thereon and one of said means is the simulation of a football frictionally engaged to slide and to rotate over said portion and having an opening on each side through which said indications are observable, and the other of said means comprises a slide having a finger member and a perforation and frictionally slidable on the flat portion of said first named arm and other game indications on said flat portion observable through said slide perforation.

MARTIN DOERR.